United States Patent
Morokawa et al.

[11] 3,961,840
[45] June 8, 1976

[54] DRIVING CIRCUIT FOR LIQUID-CRYSTAL DISPLAY

[75] Inventors: Shigeru Morokawa; Fukuo Sekiya; Ryuichi Maruka; Yasushi Nomura, all of Tokorozawa, Japan

[73] Assignee: Citizen Watch Co., Ltd., Tokyo, Japan

[22] Filed: May 8, 1974

[21] Appl. No.: 467,993

[30] Foreign Application Priority Data
May 15, 1973 Japan................ 48-53889

[52] U.S. Cl. ............................ 350/160 LC
[51] Int. Cl.² ............................ G02F 1/13
[58] Field of Search................ 350/160 LC

[56] References Cited
UNITED STATES PATENTS
3,654,606 4/1972 Marlowe et al........... 350/160 LC X
3,760,406 9/1973 Walton..................... 350/160 LC X Primary Examiner—John R. Corbin
Assistant Examiner—Matthew W. Koren
Attorney, Agent, or Firm—Ernest G. Montague; Karl F. Ross; Herbert Dubno

[57] ABSTRACT

To excite a liquid-crystal display element, a square wave is applied to opposite electrodes of that element by a source of alternating voltage through a switching circuit which briefly short-circuits the display element, during every change of polarity of the voltage source, by connecting both electrodes to the same potential via a low-impedance path. As the display element discharges over that path, the source is open-circuited whereby energy consumption is reduced.

8 Claims, 37 Drawing Figures

DRIVING CIRCUIT FOR LIQUID-CRYSTAL DISPLAY

FIELD OF THE INVENTION

This invention relates to a circuit arrangement for driving a liquid-crystal element which constitutes a segment of a visual display.

BACKGROUND OF THE INVENTION

In conventional display-driving systems of this kind, use is made of two signals 180° out of phase; this application of voltages of opposite polarities across the liquid-crystal display element results in a change in the visual appearance of that element either by the dynamic-scattering mode (DS mode) or by the elimination-of-twist mode in the polarization plane (TWIST mode), while application of voltage signals of like polarity across the display element restores the original appearance.

OBJECT OF THE INVENTION

The object of our invention is to provide an improved driving circuit for a liquid-crystal display which substantially reduces the power consumption of the system.

SUMMARY OF THE INVENTION

We realize this object, in accordance with our present invention, by providing a source of voltage pulses in the form of a square wave connected across the electrodes of a liquid-crystal element constituting a segment of the display whose activation or deactivation is determined by a supply of control voltage, the latter voltage being few to the electrodes of the display element via gating means in series with the aforementioned source. With the aid of switching means inserted between that source and the electrodes of the display element, this element is periodically short-circuited with concurrent open-circuiting of the source in the active state of the element during a recurrent interval which is short in comparison with a cycle of the square wave emitted by the source and which bridges a discontinuity in the voltage of that square wave.

According to another feature of our invention, two relatively dephased pulse trains are obtained from a first and a second output with a phase difference other than an integral number of half-cycles, the first output being part of the square-wave source whereas the second output is part of the switching means. One electrode of the display element is connected to the first output while the other is connectable by the gating means to the first output in the deactivated condition of the display element and to the second output in the activated condition thereof. In the latter condition, the phase difference between the two pulse trains results in a delay between voltage changes on the respective electrodes, that delay constituting the aforementioned short-circuiting interval since during that time the voltage difference across the element is zero.

Alternatively, the square-wave source may have an output connected directly to one of the electrodes and via the gating means to the other of the electrodes of the display element with relative polarity inversion therebetween, the switching means in that case advantageously comprising a pair of complementary MOS field-effect transistors (C-MOSFETs) inserted in parallel between the gating means and the second electrode. In this case, the electrodes are short-circuited and disconnected from the square-wave source by the simultaneous application of a blanking pulse and its complement to the gate leads of the two MOSFETs.

BRIEF DESCRIPTION OF THE DRAWING

The above and other features of our invention will now be described in detail with reference to the accompanying drawing in which:

FIG. 7a is a pulse diagram showing the timing of various voltages in the system of FIG. 6a;

FIGS. 7b to 7g are equivalent-circuit diagrams illustrating the mode of operation of the system of FIG. 6a;

FIGS. 9a to 9e are circuit diagrams of other embodiments of our invention;

FIG. 10b is a pulse diagram showing the timing of various voltages in the system of FIG. 10a.

SPECIFIC DESCRIPTION

Figure 1:
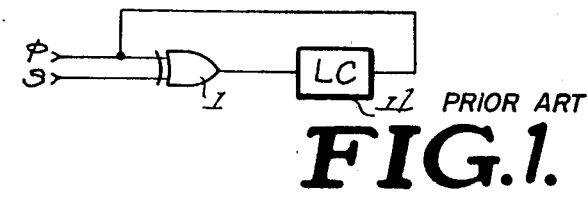
FIG. 1 is a circuit diagram of a conventional display-driving circuit.

In FIG. 1 we have shown a conventional liquid-crystal driving circuit. A selection signal S for activating a segment of the display, constituted by a liquid-crystal element 11, and an alternating-current driving signal $\phi$ are supplied to an Exclusive-OR (XOR) gate 1. The output of XOR gate 1 is delivered to one of the terminals of display element 11. The signal $\phi$ is also supplied to the opposite terminal of element 11. The display element 11 connected in the driving circuit of FIG. 1 can be represented by a condenser in an equivalent circuit.

To facilitate the understanding of our invention, we have shown in FIGS. 2a – 2f such an equivalent circuit including a condenser 21 of capacitance C connected through two ganged polarity-reversing switches 22, 23 across a direct-current power source 24 of voltage E in series with a resistor 25, representing the overall resistance of the circuit. Depending on the position of the switches, condenser 21 acquires positive and negative electric charges +q, -q.

Figure 2A:
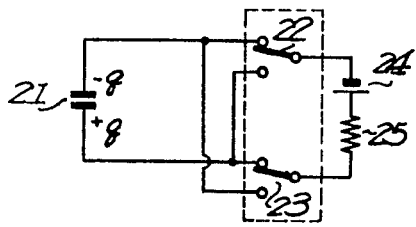
FIGS. 2a to 2d are equivalent-circuit diagrams illustrating the mode of operation of the conventional system of FIG. 1.
Figure 2B:
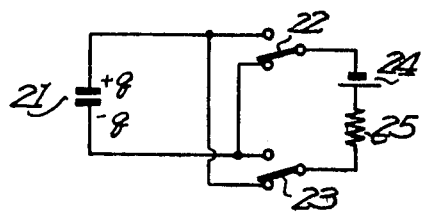
Figure 2C:
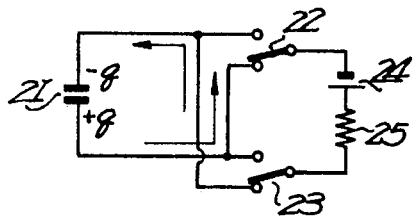

If the ganged switches 22, 23 are reversed from the position of FIG. 2a to their alternate position, condenser 21 is initially discharged through the power source 24 as indicated by arrows in FIG. 2c until the condenser is charged with polarities opposite those of FIG. 2a as shown in FIG. 2b.

Figure 2D:
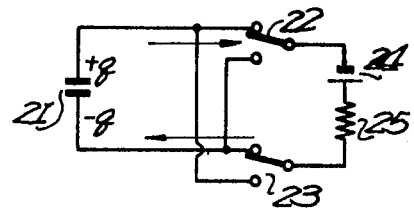

If the switches 22, 23 are restored to their previous position as shown in FIG. 2d, the condenser 21 is again initially discharged through the power source 24 as indicated by arrows in FIG. 2d until the charges stored on the electrodes of the condenser 21 again have their original polarities as shown in FIG. 2a.

In the conventional display-driving circuit shown in FIG. 1, the voltages of opposite polarities are alternately applied to the liquid-crystal display element 11 with the frequency of the alternating-current driving signal $\phi$. As a result, one driving cycle consists of a sequence of states represented by FIG. 2a → FIG. 2c → FIG. 2b → FIG. 2d → FIG. 2a.

Figure 2E:
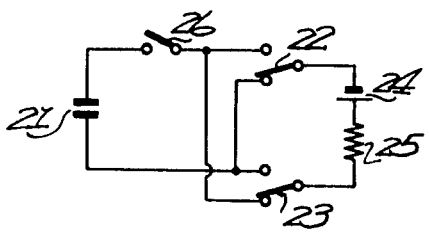
FIGS. 2e and 2f are similar circuit diagrams relating to our present improvement.

In FIG. 2e we have shown a switch 26 for disconnecting the supply voltage of battery 24 from condenser 21 in the circuit condition of FIG. 2b. After the switch 26 is closed, the condenser 21 acquires positive and negative charges in the same manner as in the circuit condition shown in FIG. 2b.

During the changeover from the stable condition of FIG. 2a to the stable condition of FIG. 2b there occurs the dissipation of energy in the resistor 25 equal to 2 $CE^2$.

The energy consumption during changeover from the open-circuit condition of FIG. 2e, in which the condenser 21 is not charged, to the condition of FIG. 2b by closure of the switch 26 is equal to ½ $CE^2$.

Figure 2F:
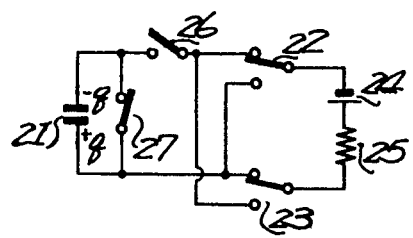

In FIG. 2f we show a switch 27 connected in parallel with the condenser 21 for the purpose of establishing a low-impedance discharge path thereacross. The switch 27 is so ganged with the switch 26 that when the latter is closed the switch 27 is opened and vice versa. In the circuit condition shown in FIG. 2f, the opening of series switch 26 with closure of short-circuiting switch 27 brings about the discharge of the condenser 21 through the low-impedance path of switch 27 to establish a circuit condition which is the same as the transient condition shown in FIG. 2c.

Then, if the short-circuiting switch 27 is opened with closure of series switch 26, the condenser 21 is charged as shown in FIG. 2b and the consumed energy becomes the sum of the energy loss ½ $CE^2$ produced during changeover from the circuit condition shown in FIG. 2f to the circuit condition shown in FIG. 2c and the energy loss ½ $CE^2$ produced during the changeover from the circuit condition shown in FIG. 2c to the circuit condition shown in FIG. 2b, i.e. $CE^2$. This improvement is due to the fact that the use of the short-circuiting switch 27 causes the discharge current to flow through a low-impedance path instead of the resistor 25 in series with the power source 24. It can thus be easily calculated that the energy loss occurring in a circuit including the short-circuiting switch 27 is 50% smaller than that caused by a direct changeover from the condition of FIG. 2a through that of FIG. 2c to that shown in FIG. 2b or from that shown in FIG. 2b through that shown in FIG. 2d to that shown in FIG. 2a.

Such halving of the energy loss is realized in practice if use is made of a field-effect-transistor type of liquid crystal whose power consumption due to the direct-current component of the alternating current applied to it is substantially zero. Even with a liquid crystal of the dynamic-scattering type, with significant power consumption due to the direct-current component of the alternating current applied to it, the energy loss can be reduced by several tens of percentage points.

The display system which makes use of the short-circuiting switch 27 may be driven by an alternating current whose frequency is lower than 100 Hz.

In FIGS. 3a to 3e, reference numerals 28 and 29 designate switches adapted to be operated independently of each other. In the switching positions shown in FIGS. 3a and 3d the voltages applied across the liquid-crystal display element 11 are of opposite polarities whereas in the position shown in FIGS. 3b and 3c they are of the same polarity to cut out the power source 30.

Thus, the following four switching modes are possible in one operating cycle to reverse and then restore the voltage applied across the liquid-crystal display element 11 (the letters $a, b, c, d$ representing the positions of FIGS. 3a, 3b, 3c, 3d, respectively).

First Switching mode:
(a) — (b) — (d) — (c) — (a)
Second Switching mode:
(a) — (b) — (d) — (b) — (a)
Third Switching mode:
(a) — (c) — (d) — (c) — (a)
Fourth Switching mode:
(a) — (c) — (d) — (b) — (a)

In FIGS. 4a to 4d we have shown pulse diagrams illustrating the timing of two voltages $V_A$ and $V_B$ present on armatures A and B of the switches 28 and 29, respectively, and of the differential voltage $V_{LC}=(V_A-V_B)$ applied across the display element 11. The voltage waves $V_A$, $V_B$ and $V_{LC}$ shown in FIGS. 4a and 4b correspond to the aforedescribed first and third switching modes, respectively. In both instances the voltage $V_{LC}$ is the same.

Figure 3A:
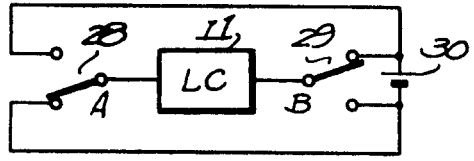
FIGS. 3a to 3e are equivalent-circuit diagrams further illustrating the operation of a display-driving system according to our invention.
Figure 3B:
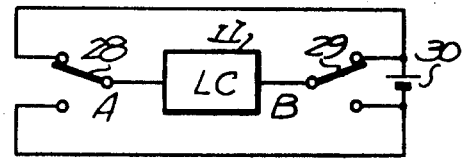
Figure 3C:
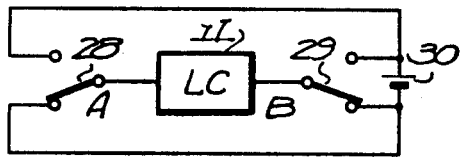
Figure 3D:
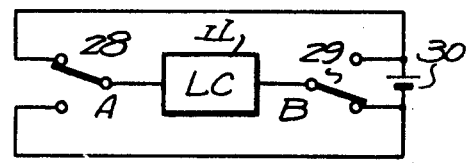
Figure 4A:
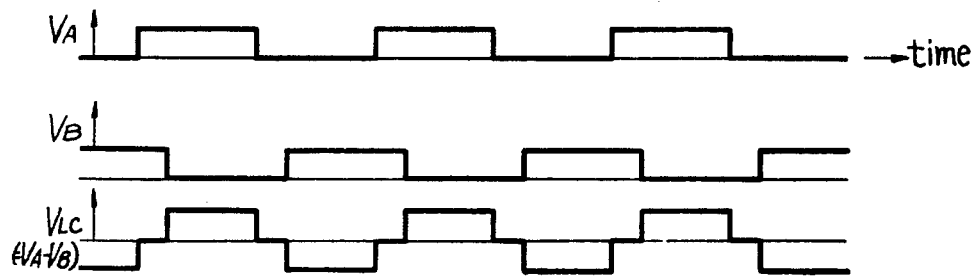
FIGS. 4a to 4d are pulse diagrams showing the timing of various voltages applied to opposite terminals of a liquid-crystal display element in a system according to our invention.
Figure 4B:
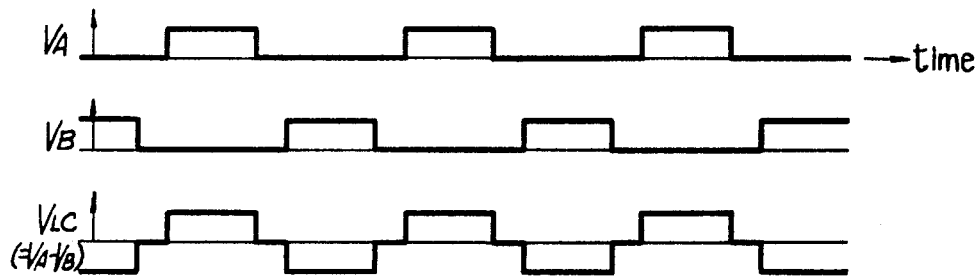
Figure 4C:
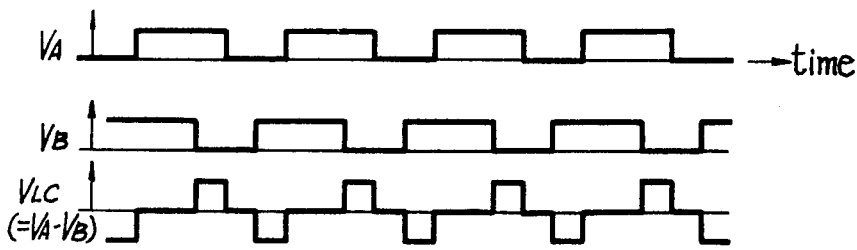

FIG. 4c shows another timing of the voltages $V_A$, $V_b$ and $V_{LC}$ in the first switching mode, the duration of the circuit condition shown in FIG. 3b being here three times that of the circuit conditions shown in FIGS. 3a, 3c and 3d.

Figure 4D:
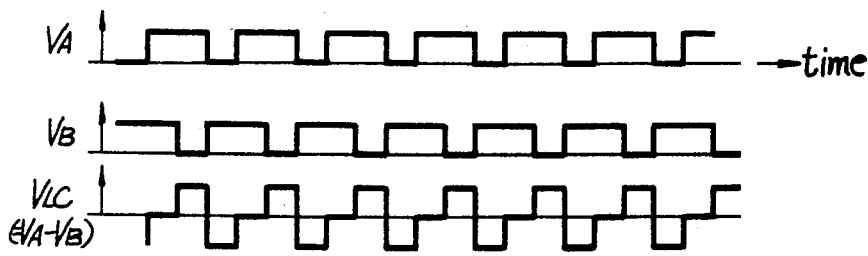

The timing of the pulse trains shown in FIG. 4c results in a foreshortening of the positive and negative pulses of voltage wave $V_{LC}$ compared with FIGS. 4a and 4b. This also applies to FIG. 4d showing an abbreviated switching mode (a) — (b) — (d) — (a) — (b) —(d) — (a) with direct polarity reversal (and therefore a diminished saving of energy) on the trailing edges of the stepped pulses $V_{LC}$.

Figure 3E:
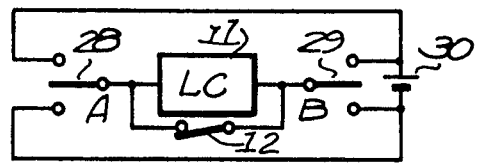

In FIG. 3e we have shown a modification of the circuit shown in FIG. 3a in which each of the switches 28 and 29 has an intermediate position with its armature A, B disconnected from the power source 30. In this neutral position a switch 12 connected across the liquid-crystal display element 11 is closed to short-circuit the display element 11. With this further position we can establish the following five additional switching modes supplementing the four modes (other than that of FIG. 4d) listed above, the letter $e$ representing the circuit condition of FIG. 3e:

Fifth Switching mode:
(a) — (c) — (d) — (e) — (a)
Sixth Switching mode:
(a) — (e) — (d) — (b) — (a)

Seventh Switching mode:
(a) — (e) — (d) — (c) — (a)
Eighth Switching mode:
(a) — (e) — (d) — (e) — (a)
Ninth Switching mode:
(a) — (b) — (d) — (e) — (a)

Figure 5:
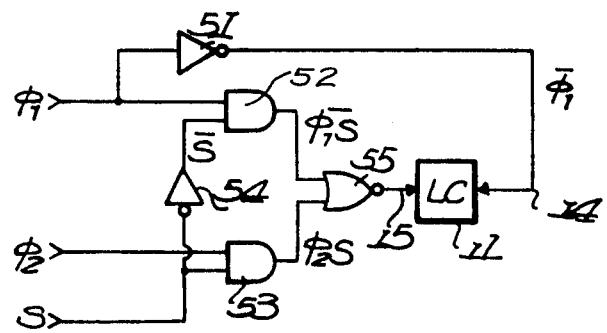
FIG. 5 is a circuit diagram of an embodiment of our invention.

FIG. 5 shows an embodiment of the display-driving circuit according to the invention which can perform the above-described nine switching modes. An alternating-current driving signal $\Phi_1$ is supplied to an inverter 51 by which the phase of the signal $\phi_1$ is reversed to obtain a signal $\overline{\phi}_1$ fed to a terminal 14 of the liquid-crystal display element 11. A like signal $\phi_2$ delayed with reference to the signal $\overline{\phi}_1$ by a phase difference $\Delta t$ is applied to an AND gate 53 to which is also applied the segment-selection or control signal S. The phase difference $\Delta t$ determines a time interval during which the capacitance represented by display element 11 is discharged through a short-circuit bypassing the power source to reduce the energy loss and to intensify the visual contrast between the activated and the deactivated display element. The control signal S is also supplied to an inverter 54 delivering its complement $\overline{S}$. The signal $\overline{S}$ is applied to an AND gate 52 which also receives the pulse train $\phi_1$.

The output signal $\phi_1\overline{S}$ and AND gate 52 and the output signal $\phi_2S$ of AND gate 53 are delivered to a NOR gate 55 whose output signal $(\overline{\phi_1\overline{S}+\phi_2S})$ is applied to another terminal 15 of display element 11. As a result, there is developed across terminals 14 and 15 a signal given by $\overline{\phi}_1-\overline{\phi_1\overline{S}+\phi_2S}$.

If the control signal S is zero, $\overline{\phi}_1-\overline{\phi}_1=0$ and hence no voltage difference exists across the display element 11. If the control signal S is 1, the voltage difference $\overline{\phi}_1-\overline{\phi}_2$ is developed across element 11.

The signal $\phi_2$ lags the signal $\overline{\phi}_1$ of like frequency by $\Delta t$. Alternatively, use may be made of pulse trains $\phi_1$ and $\phi_2$ whose frequencies are different from each other provided the condition given by the following equation is satisfied:

$$\int_0^T (\phi_1 - \phi_2)dt = 0$$

where T is a period shorter than the least possible time for the occurrence of a non-reversible reaction detrimental to the liquid crystal. In this case, too, the capacitance of the display element must be discharged through a short-circuit.

Figure 6A:
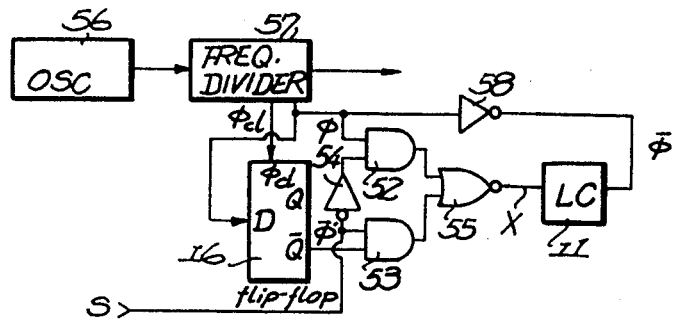
FIG. 6a is a diagram of a pulse-generating circuit for the system of FIG. 5.
Figure 7A:
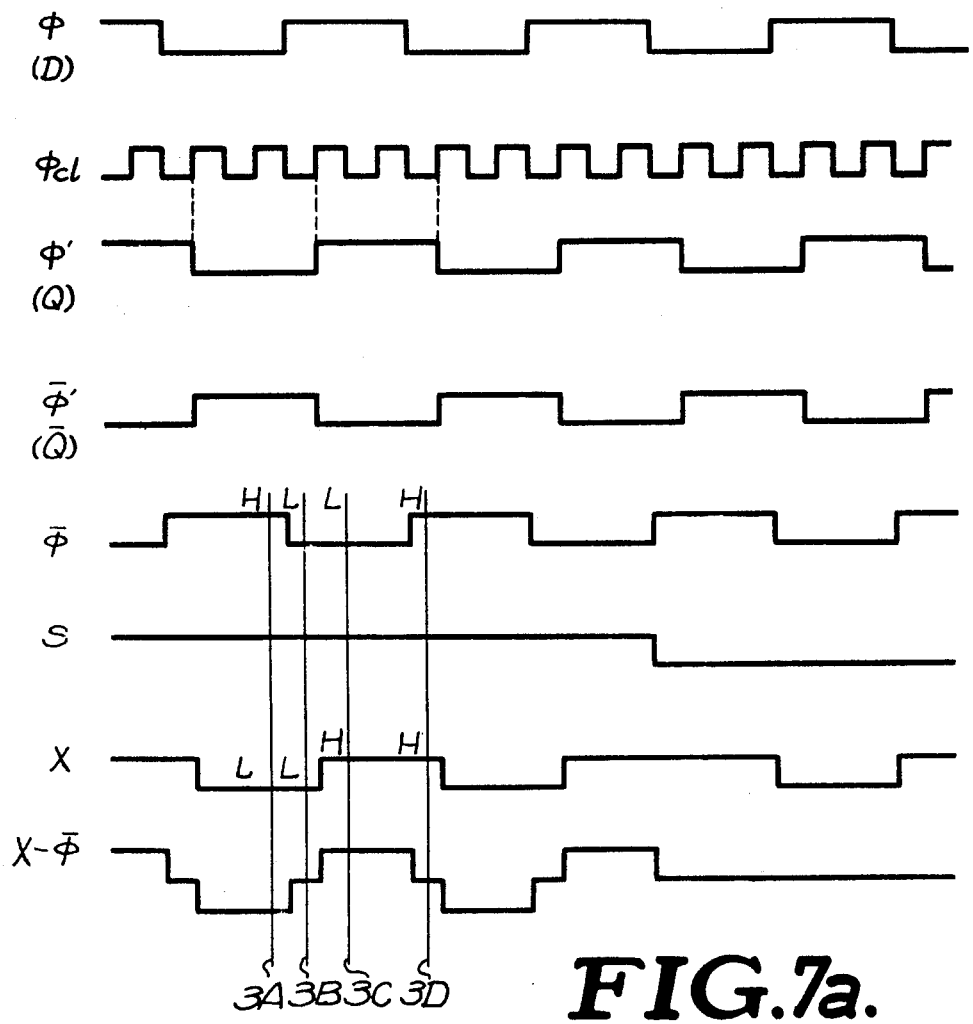

In FIG. 6a we have shown a circuit diagram similar to that of FIG. 5 but showing details of the source of driving pulses and associated switching means for generating two relatively dephased pulse trains $\overline{\phi}$, X (see also FIG. 7a).

A high-frequency signal is delivered from an oscillator 56 to a frequency divider 57 which generates a square wave $\phi$ on an output connected to an inverter 58. The inverted driving signal $\overline{\phi}$ is applied to one of the two terminals or electrodes of display element 11. The signal $\phi$ is also delivered to a data input D of a flip-flop 16 whose switching input receives a clock signal $\phi_{cl}$ of relatively elevated frequency derived from a higher-frequency stage of divider 57 ahead of the lower-frequency stage which supplies the pulse train $\phi$. As shown in FIG. 7a, the clock signal $\phi_{cl}$ sets the flip-flop 16 on a leading edge following the energization of input D and resets the flip-flop 16 on a leading edge following de-energization of that input. As a result, a signal $\phi'$ which lags the signal $\phi$ by half a cycle of clock signal $\phi_{cl}$ appears on a flip-flop output Q together with its complement $\overline{\phi}'$ on another output $\overline{Q}$. If we substitute the signals $\overline{\phi}'$ and $\phi$ for the signals $\phi_2$ and $\phi_1$ shown in FIG. 5, the output signal X of the NOR gate 55 is again given by $X=\overline{\phi'S+\phi\overline{S}}=\phi_2S+\phi_1\overline{S}$. In this case, therefore, display element 11 is subjected to a voltage difference $(\overline{\phi_2S+\phi_1\overline{S}})-\overline{\phi}_1$. At an instant when the control signal S=0, the voltage difference across the display element 11 becomes zero, whereas with S=1 that voltage difference becomes $(\overline{\phi}_2-\overline{\phi}_1)$.

In the embodiment of FIG. 6a the relative dephasing of the two driving pulse trains is brought about by a delay element in the form of the data-type flip-flop 16. Alternatively, other logical switching circuits as shown in FIG. 6b or 6c may be used for this purpose.

Figure 6B:
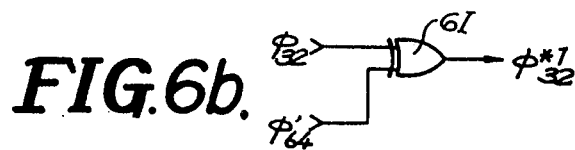
FIG. 6b is a diagram of a modified pulse-generating circuit.
Figure 6C:
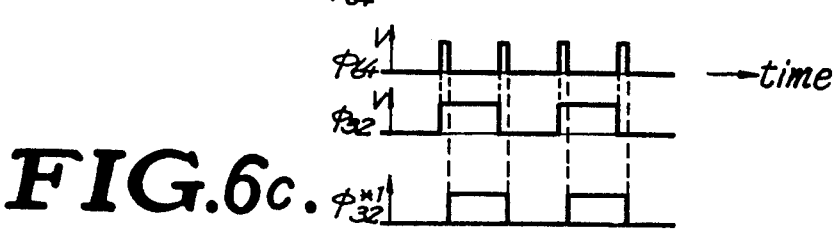
FIG. 6c is a pulse diagram relating to the operation of the circuit of FIG. 6b.

In FIG. 6b the logic circuit includes an XOR gate 61 receiving on one input a driving pulse train $\phi_{32}$, having a frequency of 32 Hz, and on another input a signal $\phi'_{64}$ originating at the same frequency divider and having a frequency of 64 Hz. From these signals $\phi_{32}$ and $\phi'_{64}$ the XOR gate 61 derives a signal $\phi_{32}$ *1 lagging the signal $\phi_{32}$ by a phase difference equal to the pulse width of the signal $\phi'_{64}$, as illustrated in FIG. 6c.

Figure 6D:
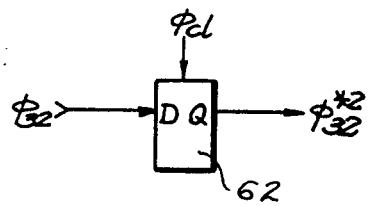
FIG. 6d is a diagram of another modified pulse-generating circuit.
Figure 6E:
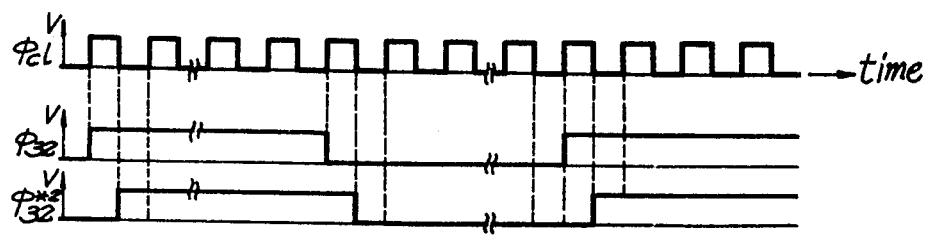
FIG. 6e is a pulse diagram relating to the operation of the circuit of FIG. 6d.

In FIG. 6d a latch circuit 62 has a switching input receiving the clock signal $\phi cl$, as does the flip-flop 16 shown in FIG. 6a, and a data input D for the signal $\phi_{32}$. This latch circuit emits a signal $\phi_{32}$ *2 lagging the signal $\phi_{32}$ by half a cycle of the signal $\phi_{cl}$, as illustrated in FIG. 6e.

Instead of these logic circuits, use may be made of a time-constant network sandwiched between amplifiers such as, for example, an RC integration circuit and the like.

Moreover, with the use of the logic circuit of FIG. 6d as the delay element, the required clock pulses may be generated by a separate oscillator tuned to a suitable frequency.

Figure 7B:
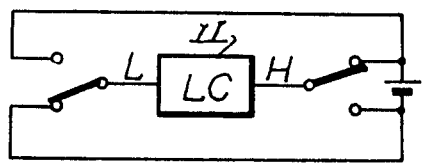

In FIG. 7a we have indicated by lines 3A, 3B, 3C and 3D successive switching positions respectively represented by the equivalent circuits of FIGS. 7b/7c, 7d, 7e/7f and 7g.

Figure 7C:
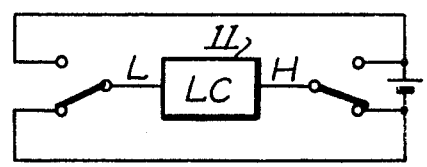
Figure 7D:
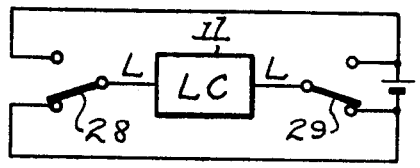
Figure 7E:
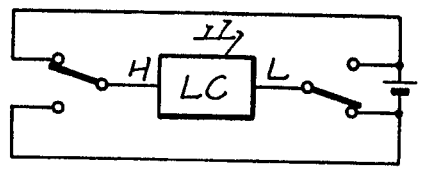
Figure 7F:
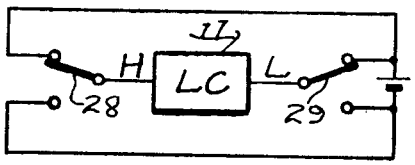
Figure 7G:
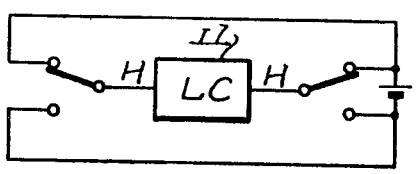

Thus, the circuit condition shown in FIG. 7b corresponds to the phase relationship along line 3A in FIG. 7a in which the voltage X applied to the left-hand electrode of display element 11 is at low level L whereas the voltage $\overline{\phi}$ on the right-hand terminal is at high level H. If the circuit condition is changed to that of FIG. 7c, the capacitance of display element 11 maintains these relative potentials until that element is discharged through the short-circuit via switches 28, 29 to establish the phase relationship L — L of line 3B as shown in FIG. 7d. A further changeover to the circuit condition of FIG. 7e brings about the phase relationship indicated by the line 3C, the input voltages of display element 11 being now at high level H (left) and low level L (right), thereby charging the liquid crystal. This phase relationship does not change immediately upon switchover to the condition shown in FIG. 7f; the two terminals of the display element are now again short-circuited, thereby discharging the element 11 through the switches 28 and 29 to create the condition shown in FIG. 7g with voltage levels H — H according to line 3D.

In the embodiment shown in FIG. 5, the inverter 51 and the NOR gate 55 receive their inputs from a common power source, and their outputs at high level H and low level L respectively coincide with the positive and negative potentials of the power source. If the voltages applied to the two liquid-crystal electrodes are identical, element 11 is short-circuited.

Even when identical input voltages are present on the terminals of the liquid-crystal display element 11, yet if the inverter 51 and the NOR gate 55 or their equivalents are supplied from separate and independent power sources, a current may still flow from one power source to the other. Also, if the output levels of inverter 51 and NOR gate 55 do not coincide with the positive and negative potentials of a common power source, a portion of the discharge current flows through the power source.

In order to provide a display-driving circuit adapted to conform the output voltages of a logic circuit with the positive and negative source potentials, we prefer to provide a gating logic circuit comprising complementary (C-MOS) field-effect transistors rather than a bipolar transistor.

Figure 8:
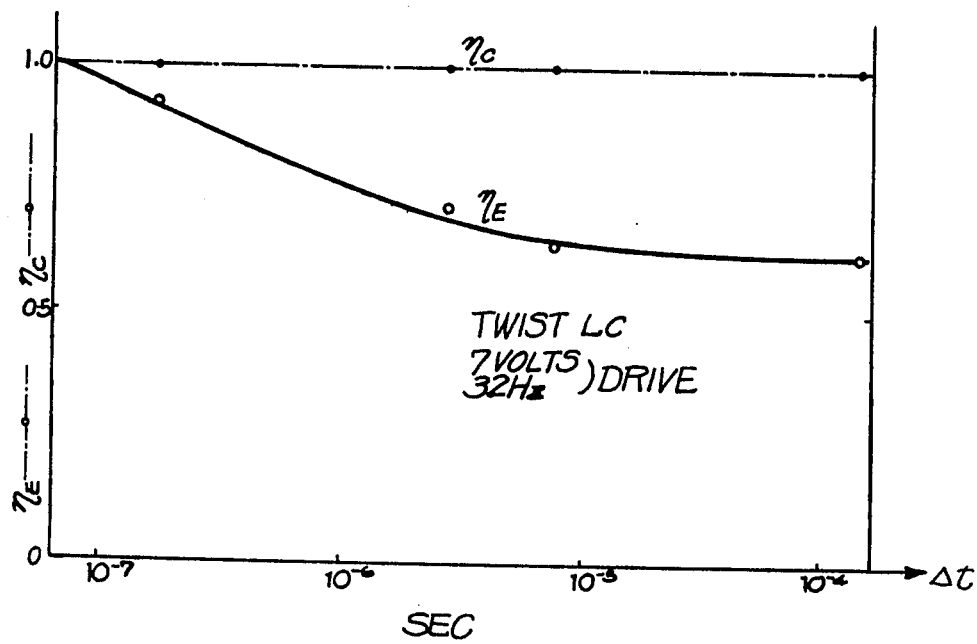
FIG. 8 is a comparative graph showing the energy consumption in a display-driving system according to our invention and in a conventional system according to FIG. 1.

In FIG. 8 we have shown graphs illustrating the driving-current ration $\eta_E$ and the contrast ratio $\eta_C$ between our improved system (FIG. 6a) and the conventional system shown in FIG. 1 in which anitphasal pulse trains are applied across a TWIST liquid-crystal display element. These graphs are plotted on the basis of the results of experimental tests in which a TWIST liquid-crystal display element was driven by an alternating voltage of 7V at a frequency of 32 Hz. These ratios $\eta_E$ and $\eta_C$ have been plotted in FIG. 8 against the time $\Delta t$ which is the phase difference between pulse trains $\overline{\phi_1}$ and $\phi_2$ (FIG. 5). With extremely short phase delays ($\Delta t \approx 0$), as is the case with the conventional display-driving circuit shown in FIG. 1, the current has unity value as indicated by a dot-and-dash line at level 1. As seen from the test results shown in FIG. 8, the system according to our invention significantly reduces the consumption of source current and therefore of energy, with $\eta_E$ dropping to about 60% for $\Delta t = 10^{-4}$ sec.

In FIGS. 9a, 9b, 9c, 9d and 9e we have shown various modifications of the logic circuit shown in FIG. 5 in which use is made of C-MOS field-effect transistors.

In FIG. 9a a display segment 94, again constituted by a liquid-crystal element, has its right-hand input terminal 96 connected to a lead carrying the pulse train $\overline{\phi}$ and has its left-hand input terminal 95 coupled to sources of pulse trains $\phi_1$ and $\phi_2$ via first and second pairs of branch circuits, the first pair including two C-MOSFETs 90' (P), 91' (N) whereas the second pair includes two C-MOSFETs 92' (P) and 93' (N). MOSFETs 90' and 91', whose gate leads receive the driving signal $\phi_1$, lie in series with two other MOSFETs 90 (P) and 91 (N) receiving on their gate leads the control signal S and its complement $\overline{S}$, respectively. Similarly, MOSFETs 92' and 93', whose gate leads receive the driving signal $\phi_2$, lie in series with two further MOSFETs 92 and 93 with gate leads energized by signals $\overline{S}$ and S, respectively. The two P-channel branch circuits terminate at a positive pole and the two N-channel branch circuits terminate at a negative pole of a direct-current supply.

In FIG. 9b the MOSFETs 90'–93' have been omitted and the positive and negative d-c poles of FIG. 9a have been replaced by sources of driving signals $\phi_1$ and $\phi_2$, respectively. Liquid-crystal terminal 95 is thus coupled to these sources through the MOSFET channels rather than through their gates as in the preceding embodiment.

Figure 9C:
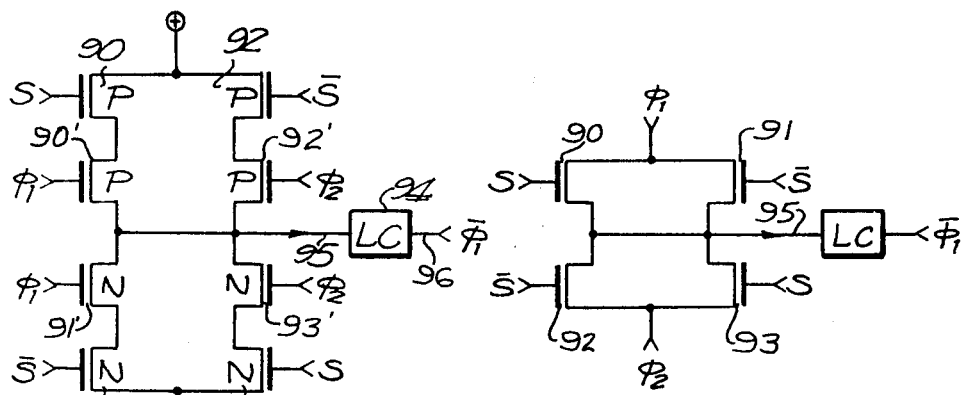
Figure 9C:
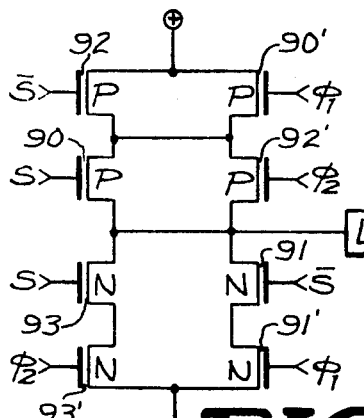
Figure 9D:
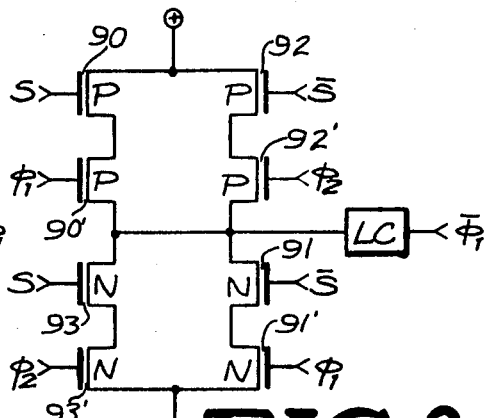
Figure 9E:
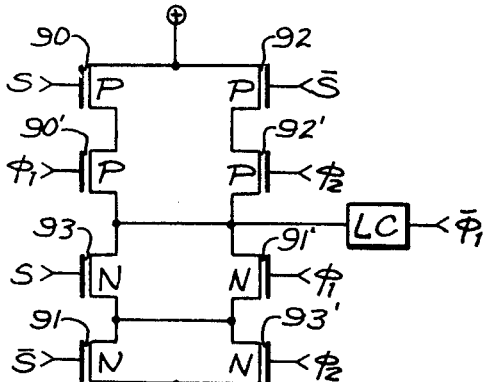

In FIG. 9c the branch circuits 90, 90' and 92, 92' share a common cross-section 97. FIG. 9d is identical with FIG. 9a except for a transposition of MOSFETs 91 and 91' as well as 93, 93'. FIG. 9e differs from FIG. 9c in that the cross-connection 97 is common to branch circuits 91, 91' and 93, 93'.

At an instant when the control signal S is positive, P-channel MOSFET 90 and N-channel MOSFET 91 are both cut off whereas P-channel MOSFET 92 and N-channel MOSFET 93 both conduct. As a result, the left-hand terminal 95 of the liquid crystal 94 is energized by inverted pulse train $\overline{\phi_2}$. Across the liquid crystal 94 there appears therefore the voltage $\overline{\phi_1}-\overline{\phi_2}$. Conversely, at an instant when the control signal S is negative, terminal 95 is energized by pulse train $\overline{\phi_1}$ and, as a result, the voltage appearing across the liquid crystal 94 becomes $\overline{\phi_1}-\overline{\phi_1}=0$.

If it is desired to drive a liquid-crystal display element whose area is large, the driving output impedance must be made small. If the mutual conductance Gm of the driving transistors is directly reduced, the chip size of C-MOS/C becomes large. In this case we prefer with integrated circuitry to add to the output side of the driving circuit a C/MOS buffer such as a large-size C/MOS inverter or a combination of small-size and large-size inverters and to apply the voltage through such buffer across the liquid-crystal display element.

The integrated circuits shown in FIGS. 9a to 9e have the following advantages.

In the first place, the use of C-MOS insures a small power consumption in the display system according to the invention. Thus, the application of the same potential to opposite electrodes of a liquid-crystal display element causes the electronic switches to short-circuit the liquid crystal whereby the electric charge stored on the display element is discharged in a low-impedance path to reduce the consumed power to half that of the conventional system. With a bipolar transistor, even if complementary circuitry is used, some power consumption is involved in the short-circuiting operation. With non-complementary circuitry it is difficult to equalize the input voltages of the liquid-crystal display element and hence to establish the short-circuit.

Figure 10A:
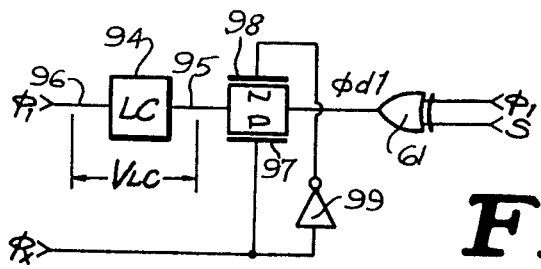
FIG. 10a is a circuit diagram of a further embodiment of the present invention.
Figure 10B:
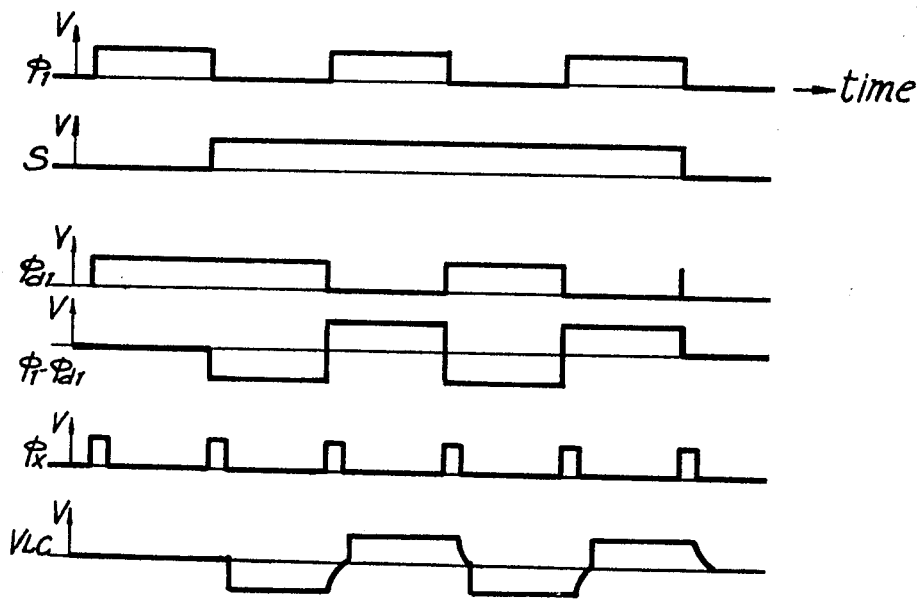

In FIGS. 10a and 10b we have shown another embodiment of the present invention in which the polarity of the input voltages is reversed with natural discharge of the capacitance of the liquid-crystal display element. In this instance no phase difference $\Delta t$ is introduced between a pulse train $\phi_1$, fed to the terminal 96 of display segment 94, and another pulse train $\phi_{d1}$ derived from signals $\phi_1$ and S by means of XOR gate 61. Pulse train $\phi_{d1}$ passes in parallel through a P-channel MOSFET 97, whose gate receives a succession of blanking pulses $\phi_x$ bridging the discontinuities of square wave $\phi_1$, and an N-channel MOSFET 98 whose gate receives the complements of these blanking pulses $\phi_x$ through an inverter 99.

FIG. 10b shows the relative timing of the signals $\phi_1$ and $\phi_x$ along with the differential voltage $V_{LC}$ developed across the liquid-crystal display element 94. The leading edge of signal $\phi_x$ precedes the change of the driving voltage $\phi_1$ while its trailing edge follows that changeover. The signal $\phi_{d1}$ is obtained from the driving circuit.

Our invention, affording significant economies in operating energy as compared with the conventional system, is applicable to electronic wristwatches and portable electronic computers in order to minimize their power consumption and to provide a simplified, improved and more reliable technique for their manufacture.

For example, the circuitry of an electronic liquid-crystal-display wristwatch makes the power consumed by the driving circuit of the display element 90% of the total consumed power. The invention renders it possible to reduce such power consumption by 40%, the reduction of the overall power consumption being thus 36% whereby the service life of a supply battery normally effective for 1 year can be lengthened by about 4 months.

In the case of a table clock, the use of field-effect transistors according to the invention can further reduce the power consumption.

Of course, any electric control element other than a field-effect transistor may be incorporated into the driving circuit according to the invention.

The present invention may be utilized wherever an alternating voltage drives an electro-optical element which may be replaced by a condenser.

The invention is also applicable to an electronic timepiece and the like comprising a booster circuit. In such case, with a booster efficiency of, say 50%, a saving equaling twice the reduction of power loss in the driving circuit can be realized. As a result, the capacity of the condenser used in the booster circuit can be made small.

The driving system according to the invention is adaptable to a capacitive display element actuated by controlling electric charges, e.g. for selective polarization of such an alement or for a shift of areas of internal polarization by voltage reversals.

As display elements forming part of a system according to our invention, we may mention photomodulation elements controlling light transmission by placing an electric charge on, for example, a layer of $ADP(NH_4H_2PO_4)$, $KDP(KH_2PO_4)$, $Gd_2[(MoO_4)_3]$, $PLZT[(Pb, La)(Zr, Ti)O_3]$ or insulating oil, as well as electro-luminescent devices having phosphor particles dispersed in a dielectric.

What is claimed is:

1. In a visual display system including a liquid-crystal element constituting a segment of the display, said element being provided with a pair of electrodes for applying thereacross a voltage difference exciting a change in the visual appearance of said element, the combination therewith of a source of voltage pulses in the form of a square wave connected across said electrodes, gating means in series with said source connected to a supply of control voltage for selectively activating said segment, and switching means between said source and said electrodes for periodically short-circuiting said element with concurrent open-circuiting of said source in the activated state of said element during a recurrent interval which is short in comparison with a cycle of said square wave, said interval bridging a discontinuity in the voltage of said square wave.

2. The combination defined in claim 1 wherein said source is provided with a first output carrying a first pulse train, said switching means having a second output and being connected to said source for generating on said second output a second pulse train dephased relatively to said first pulse train with a phase difference other than an integral number of half-cycles, one of said electrodes being connected to said first output, the other of said electrodes being connectable by said gating means to said first output in the deactivated condition and to said second output in the activated condition of said element, said interval being the delay between voltage changes on said electrodes due to said phase difference.

3. The combination defined in claim 2 wherein said display system forms part of a timepiece, said source including an oscillator and a frequency divider connected thereto, said frequency divider being provided with a plurality of stages, said switching means having input connections to different stages of said frequency divider.

4. The combination defined in claim 3 wherein said stages include a lower-frequency stage and a higher frequency stage, said switching means comprising a flip-flop with a data input connected to said lower-frequency stage and a switching input connected to said higher-frequency stage.

5. The combination defined in claim 4 wherein said gating means is provided with a first input lead connected to said supply for receiving therefrom said control voltage S, a second input lead including an inverter connected to said supply for receiving therefrom the complement $\overline{S}$ of said control voltage S, a third input lead connected to said lower-frequency stage in parallel with said date input for receiving said square wave $\phi$, and a fourth input lead connected to an output of said flip-flop for receiving therefrom a square wave $\overline{\phi}'$ lagging said square wave $\phi$, said gating means having an output connected to said one of said electrodes for delivering thereto the logical sum of signals $\overline{\phi}'S$ and $\phi\overline{S}$, the other of said electrodes being connected to said lower-frequency stage.

6. The combination defined in claim 3 wherein said switching means comprises an Exclusive-OR gate with input leads connected to different stages of said frequency divider.

7. The combination defined in claim 2 wherein said gating means comprises a first pair of branch circuits coupling said other of said electrodes with said first output, a second pair of branch circuits coupling said other of said electrodes with said second output, a first pair of complementary MOS field-effect transistors in said first pair of branch circuits with gate leads connected to said supply, a second pair of complementary MOS field-effect transistors in said second pair of branch circuits with gate leads connected to said supply, and inverter means between said supply and one of the gate leads of each of said pairs of transistors for concurrently blocking said first pair of branch circuits in said activated condition and said second pair of branch circuits in said deactivated condition.

8. The combination defined in claim 1 wherein said source has an output connected directly to one of said electrodes and via said gating means to the other of said electrodes with relative polarity inversion therebetween, said switching means comprising a pair of complementary MOS field-effect transistors inserted in parallel between said gating means and said other of said electrodes, said transistors being respectively provided with an inverting and a non-inverting gate lead connected to a generator of blanking pulses timed to coincide with said interval.

* * * * *